United States Patent [19]

Lee

[11] Patent Number: 5,765,137
[45] Date of Patent: Jun. 9, 1998

[54] COMPUTER SYSTEM AND COMPUTER-IMPLEMENTED PROCESS FOR CORRELATING PRODUCT REQUIREMENTS TO MANUFACTURING COST

[75] Inventor: Don Joon Lee, Cambridge, Mass.

[73] Assignee: Massachusetts Institute of Technology, Cambridge, Mass.

[21] Appl. No.: 610,212

[22] Filed: Mar. 4, 1996

[51] Int. Cl.⁶ .................................................. G06F 17/50
[52] U.S. Cl. ............................................ 705/7; 364/468.16
[58] Field of Search .................... 705/7, 8, 9, 10, 705/11; 364/468.09, 468.1, 468.12, 468.03, 468.04, 468.05, 468.16, 468.17, 468.15, 468.18, 468.28

[56] References Cited

U.S. PATENT DOCUMENTS

| | | | |
|---|---|---|---|
| 4,598,376 | 7/1986 | Burton et al. | 364/470 |
| 4,646,238 | 2/1987 | Carlson, Jr. et al. | 364/403 |
| 4,875,162 | 10/1989 | Ferriter et al. | 364/401 |
| 4,887,206 | 12/1989 | Natarajan | 364/401 |
| 4,887,207 | 12/1989 | Natarajan | 364/401 |
| 5,047,947 | 9/1991 | Stump | 364/468 |
| 5,093,794 | 3/1992 | Howie et al. | 364/468 |
| 5,121,330 | 6/1992 | Blaha et al. | 364/468 |
| 5,128,860 | 7/1992 | Chapman | 364/401 |
| 5,189,606 | 2/1993 | Burns et al. | 364/401 |
| 5,208,765 | 5/1993 | Turnbull | 705/10 |
| 5,216,593 | 6/1993 | Dietrich et al. | 364/402 |
| 5,229,948 | 7/1993 | Wei et al. | 364/468 |
| 5,233,513 | 8/1993 | Doyle | 354/401 |
| 5,249,120 | 9/1993 | Foley | 364/401 |
| 5,260,866 | 11/1993 | Lisinski et al. | 364/401 |
| 5,260,883 | 11/1993 | Wilson | 364/512 |
| 5,278,751 | 1/1994 | Adiano et al. | 364/402 |
| 5,280,425 | 1/1994 | Hogge | 364/402 |
| 5,291,397 | 3/1994 | Powell | 364/402 |
| 5,307,261 | 4/1994 | Maki et al. | 364/401 |
| 5,311,424 | 5/1994 | Mukheriee et al. | 364/401 |
| 5,311,438 | 5/1994 | Sellers et al. | 364/468 |
| 5,315,521 | 5/1994 | Hanson et al. | 364/468 |
| 5,357,439 | 10/1994 | Matsuzaki et al. | 364/468 |
| 5,369,570 | 11/1994 | Parad | 364/401 |
| 5,381,332 | 1/1995 | Wood | 364/401 |
| 5,406,477 | 4/1995 | Harhen | 364/401 |
| 5,465,378 | 11/1995 | Duensing et al. | 395/800 |

OTHER PUBLICATIONS

Anna C. Thornton, "Constraint Specification and Satisfcation in Embodiment Design," Ph. D. Thesis, Dept. of Engineering, Queens College University of Cambridge, pp. i–xv and 1–128, 1993.

Don J. Lee, et al. "The Identification and Use of Key Characteristics in the Product Development Process," Proceedings of the 1996 ASME Design Engineering Tech. Conf., pp. 1–12, Aug, 1996.

David Kazmer, et al. "Quantifying Design and Manufacturing Robustness Through Stochastic Optimization Techniques," Proceedings of the 1996 ASME Design Engineering Tech. Conf., pp. 1–12, August 1996.

R. Batchelor et al., "Conformability Analysis in Support of Design for Quality," Proc. Instn. Mech. Engrs., vol. 210, pp. 37–47, 1996.

(List continued on next page.)

*Primary Examiner*—Donald E. McElheny, Jr.
*Attorney, Agent, or Firm*—Wolf, Greenfield & Sacks, P.C.

[57] ABSTRACT

A computer system determines a quantitative measure of a manufacturer's capability to achieve a product requirement at an acceptable cost. This quantitative measure, called the manufacturer's capability curve, is a function relating a product requirement, such as a customer's need or a government regulation or other performance requirement of a component of the product, to a cost for achieving this product requirement. The use of the computer system is enhanced by following a methodology for identifying possible key characteristics as described below. This methodology allows for identification of the relationship of lower level features to higher level features of a product and identification of interaction between two or more features and their impact on product performance.

6 Claims, 8 Drawing Sheets

OTHER PUBLICATIONS

Don J. Lee et al., "Key Characteristics for Agile Product Development and Manufacturing," Proc. 4th Annual Agility Forum, vol. 2, pp. 258–268, Mar. 7–9, 1995.

Brian S. Moskal, "GM's New–Found Religion," May 1992, pp. 46–53, Industry Week.

Urmila M. Diwekar et al., "Parameter Design Methodology for Chemical Process Using a Simulator," 1994, pp. 292–298, Ind. Eng. Chem. Res., vol. 33, No. 2.

K. Ishii et al., "Product Development Based on Users' Needs Assessment by Single and Comparative Assessment Methods," 1987, pp. 39–49, Technovation, Elsevier Science Publishers B.V.

Genichi Taguchi et al., "Robust Quality," Jan.–Feb. 1990, pp. 65–75, Harvard Business Review.

Nozer D. Singpurwalla, "A Bavesian Perspective on Taguchi's Approach to Quality Engineering and Tolerance Design," Nov. 1992, pp. 18–32, IEE Transactions, vol. 24, No. 5.

Bor–Wen Cheng et al., "Optimization of Mechanical Assembly Tolerances by Incorporating Taguchi's Quality Loss Function," 1995, pp. 264–276, Journal of Manufacturing Systems, vol. 14, No. 4.

Gen–Ichi Taguchi, "Testing for Reliability—Forced Testing," pp. 49–55, Electronics and Communications in Japan, vol. 47, Nov. 1964.

M. S. Phadke et al. Selection of Quality Characteristics and S/N Ratios for Robust Design, Design, pp. 390–394, Electro/90 Conference Record (IEEE), May 9–11, 1990.

A. S. El–Gizawv et al. *A Strategy for Concurrent Product and Process Design of Aerospace Components*, Proc. Winter Annual Meeting of ASME, Dec. 1989, pp. 143–151.

Resit Unal. *Design Optimization for Cost and Quality: The Robust Design Approach*, ASEE Summer Faculty Fellowship Program, 1990, pp. 117–118.

M. S. Phadke, *Modeling of Multiple Time Series by the Method of Successive Orthogonalization* Jan. 1976, pp. 1–34, MRC Technical Summary Report #1 561, Univ. of Wisconsin–Madison, Mathematics Rsch. Ctr.

Chang–Xue Feng and Andrew Kuslak, *Design of Tolerances for Quality*, 1994, pp. 19–28, DE–vol. 68, Design Theory and Methodology –DTM '94.

Ruy Mesquita et al., *Computer–Aided Selection of Optimum Machining Parameters in Multipass Turning*, 1995, The International Journal of Advanced Manufacturing Technology, vol. 10, No. 1, pp. 19–26.

Stanislaw Plasecki and Barbara Wojcik, *A Probabilistic Model of a Manufacturing Process from a from a Quality of Products Point of View, with Regard to Interoperation Controls*, 1978, pp. 281–289, Systems Science, vol. 4, No. 4.

Jiju Antony and Ebrahim Mazharsolook, *An Application of Taguchi's Robust Parameter Design Methodology for Process Improvement*, 1996, pp. 35–41, QWTS, Mar. 1996.

Lewis E. Katz and Madhav S. Phadke, *Macro–Quality with Micro–Money*, AT&T Bell Labs Record, vol. 63, No. 6, Nov. 1985, pp. 22–28.

M. S. Phadke et al., *Maximum Likelihood Estimation of Multivariate Autoregressive–Moving Average Models*, 1977, pp. 2–59, MRC Tech. Summary Apt. #1722, Univ. of Wisconsin–Madison, Math Rsch Ctr.

Rajiv D. Banker et al., *Contextual Analysis of Performance Impacts of Outcome–Based Incentive Compensation*, 1996, pp. 920–949, Academy of Management Journal, 1996, vol. 39, No. 4.

George E. Box et al., *Quality Practices in Japan*, pp. 37–41, Quality Progress, vol. 21, No. 3, Mar. 1988.

Paul K.H. Lin et al., *Using Taguchi Methods in Quality Engineering*, pp. 55–59, Quality Progress, vol. 23, No. 9, Sep. 1990.

John R. Hauser et al. *The House of Quality*, pp. 63–73, Harvard Business Review, May–Jun. 1988.

Tuvet–Lan Tran et al., *Quality Function Deployment (gfd): An Effective Technique for Requirements Acquisition and Reuse*, Proc. 2nd IEEE Int'l Software Eng. Stand. Symp. (ISESS '95), pp. 191–200, IEEE, 1995.

*Efficient Storage and Use of Customer Requirements Data for a House of Quality*, Nov. 1992, pp. 160–162, IBM Technicl Disclosure Bulletin, vol. 35, No. 6.

Kosuke Ishii, *Computer Aided Life–Cycle Design*, Aerospace Product Process Design Interface (A93–21745 07–31), 1991 (Abstract).

G. Taguchi, *Quality Characteristic Feedback Control*, Int'l QC Forum, vol. 2, Feb. 1985 pp. 9–27, (Abstract).

Timothy L. Reed, *Using the Taguchi Method for Improved Reliability*, 1994, p. 15, 1994 Annual Reliability and Maintainability Symposium, Tutorial Notes (Abstract).

Genichi Taguchi, *Robust Technology Development*, Mar. 1993, pp. 60–62, Mechanical Engineering V115, No. 3.

Shams–ur Rahman, *Product Development Stages and Associated Quality Management Approaches* 1995, pp. 25–30, TQM Magazine V7, No. 6 (Abstract).

Biren Prasad, *A Structured Approach to Product and Process Optimization for Manufacturing and Service Industries*, 1995, pp. 123–138, Int'l Journal of Quality & Reliability Mgmt., V12, No. 9, (Abstract).

J. Lyu et al. *Design for Quality in the Shipbuilding Industry*, 1993, pp. 57–63, Int'l Journal of Quality and Reliability Management, vol. 10, No. 4 (Abstract).

Stephen Ashley, *Applying Taguchi's Quality Engineering to Technology Development*, Jul. 1992, pp. 58–60, Mechanical Engineering vol. 114, No. 7 (Abstract).

M. S. Phadke, *Optimization of Product and Process Design for Quality and Cost*, Apr.–Jun. 1988, pp. 105–112, Quality and Reliability Engineering International, vol. 4, No. 2 (Abstract).

V. M. Zaichik, *Fundamentals of Economic Calculations for Dimensional Networks of Miniature Electric Machines Using Integer Programming*, 1976, pp. 67–71, Soviet Electrical Engineering, vol. 47, No. 6 (Abstrat).

Miller, Jeffrey A., *Achieving Agile Performance Through Reengineering of the Product Definition Process*, Slides presented at 4th Annual Agility Forum, Mar. 7–9, 1995.

*Efficient Display of Relationships for a House of Quality*, IBM TDB, vol. 35, No. 7, Dec. 1992, pp. 371–372.

Cook, J. A. E., et al., *Design Parameters and Concepts*, in Proc. Workshiop Designing for Low Cost Fabrication, Apr. 16–17, 1986, Royal Aero. Soc., pp. 22–50.

COMPUTER SYSTEM AND COMPUTER-IMPLEMENTED PROCESS FOR CORRELATING PRODUCT REQUIREMENTS TO MANUFACTURING COST

STATEMENT OF GOVERNMENT RIGHTS IN THE INVENTION

The United States of America has certain rights in this invention as provided for by the terms of Contract No. F33615-94-C-4428 and Contract No. F33615-94-C-4429 awarded by the Air Force Office of Scientific Research.

FIELD OF THE INVENTION

Present invention is related to computer systems and computerized processes for analyzing manufacturing processes and engineering specifications to obtain accurate cost estimates of a manufactured product.

BACKGROUND OF THE INVENTION

A significant problem in manufacturing is determining the relationship between customer needs or other product requirements and the cost of manufacturing a product to meet those needs or requirements. One methodology currently used in some major corporations involves the identification of key characteristics. Key characteristics in general are product features, manufacturing process and assembly process parameters that significantly affect product performance, function and form, particularly as they relate to customer satisfaction and product safety. The key characteristic identification methodology provides a focus on important product, manufacturing and assembly features to help reduce development time, reduce costs, and improve the quality of products.

One methodology for identification of key characteristics uses a Taguchi loss function (TGL). See Phadke, Madhav S., *Quality Engineering Using Robust Design*, AT&T Laboratories, Prentice Hall, N.J., 1989. A TGL represents qualitatively and anecdotally perceived cost losses incurred as a function of customer dissatisfaction from diminished product performance and function due to a variation of a product feature from its nominal engineering specification. However, since TGLs are generally qualitative and anecdotal, and are generally not obtained in any quantitative manner, decisions based on such TGLs may be based on incorrect assumptions.

Figure 1A:
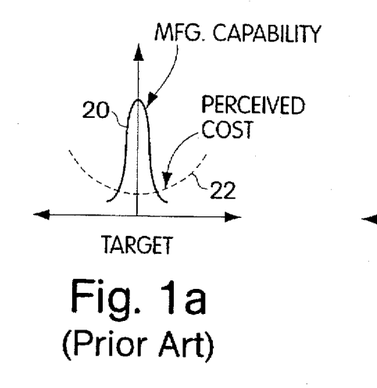
FIGS. 1A through 1C illustrate existing methods for identifying key characteristics according to manufacturing capabilities and Taguchi loss functions.
Figure 1B:
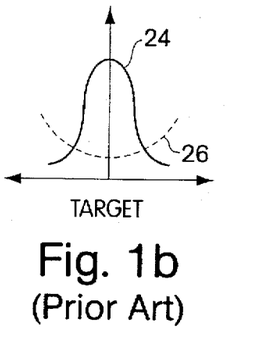
Figure 1C:
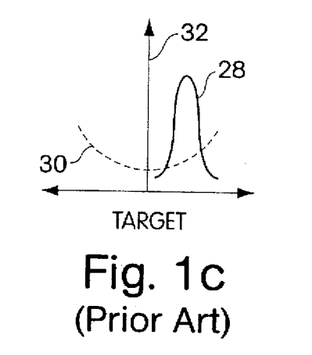

Referring now to FIG. 1(a), a manufacturing capability distribution is shown at 20 while a TGL is shown at 22. In FIG. 1(a), the product feature is not a key characteristic because variations in the product feature due to the manufacturing capability distribution do not significantly contribute to qualitative cost. However, FIG. 1(b) shows a feature which is a key characteristic since the manufacturing capability distribution, shown at 24, results in variations in the product which significantly affect a perceived cost, shown at 26. The variation in the manufacturing process or the design needs to improve for this product feature. In FIG. 1(c), the manufacturing process is precise as indicated by curve 28, but does not reach its target 32. This deviation from the target causes the feature to be a key characteristic since the perceived cost as a indicated by curve 30 is increased, and requires improvement in the ability to meet the target characteristic of the feature.

A significant problem in the implementation of a key characteristic identification methodology is due to the generally qualitative and anecdotal nature of Taguchi loss functions. That is, TGLs are generally defined in terms of an assumed shape, which may be based on a small set of customer reports on product performance or in some cases based on assumptions or speculations about what such information might be. Therefore, the TGL may be inaccurate and thus lead to incorrect decisions. For example, a lot of time, money and effort may be spent solving a problem which is not significant, or an important problem may be overlooked. Additionally, features selected for analysis to determine their key characteristic status are often selected reactively, in response to customer dissatisfaction, or based on assumptions by engineers. The lack of a systematic way to identify KCs may result in an important problem being overlooked.

SUMMARY OF THE INVENTION

The problems due to the qualitative nature of TGLs can be overcome by using a quantitative measure of a manufacturer's capability to achieve a product requirement at an acceptable cost. This quantitative measure, called the manufacturer's capability curve, is a function relating a product requirement, such as a customer's need or a government regulation or other performance requirement of a component of the product, to a cost for achieving this product requirement.

Accordingly, one aspect of the present invention is a computer system for analysis of manufacturing costs. This computer system receives an engineering specification for a product feature, correlating product performance to the product feature. A manufacturing capability distribution for the product feature is also received, which indicates a probability that the manufacturer can make the product feature have a target value, such as size. Cost information, indicating a per unit cost, is also received. The computer system includes an analysis module having inputs for receiving the engineering specifications, manufacturing capability distribution and cost information and an output providing a quantitative relationship between the performance measure and cost of manufacturing the product with the product feature.

The use of the present invention is also enhanced by following a methodology for identifying possible key characteristics as described below. This methodology allows for identification of the relationship of lower level features to higher level features of a product and identification of interaction between two or more features and their impact on product performance. This approach is fundamentally different from the practice in some industries where only problematic features are flagged as KC's.

DETAILED DESCRIPTION

The present invention will be more completely understood through the following detailed description which should be read in conjunction with the attached drawing in which similar reference numbers indicate similar structures.

A computer system is used to determine a quantitative measure of a manufacturer's capability to achieve a product requirement at an acceptable cost. This quantitative measure, called the manufacturer's capability curve, is a function relating a product requirement, such as a customer's need or a government regulation or other performance requirement of a component of the product, to a cost for achieving this product requirement. The use of the computer system is enhanced by following a methodology for identifying possible key characteristics as described below. This methodology allows for identification of the relationship of lower level features to higher level features of a product and identification of interaction between two or more features and their impact on product performance.

There are three fundamental categories of key characteristics: product (PKC), manufacturing (MKC), and assembly (AKC). PKCs are the geometric features, material properties, information or energy of a product that are highly constrained or for which minute deviations from nominal specifications, regardless of manufacturing capability, have a significant impact on the performance, function and form of the product at each product assembly level. PKCs are permanent for a given product architecture. PKCs are thus associated with the important physical properties of the product that are needed to meet a product requirement. Although there may be many features that are needed to meet a product requirement, the PKCs are those features which, when a change is made, significantly affect the product requirement. Assembly and manufacturing capability are not initially considered in defining a PKC. However, iterations might need to be conducted to ensure that a selected set of PKC's can be manufactured or assembled properly.

MKCs include manufacturing machine process parameters and/or fixturing features for machine tools and equipment that significantly affect the realization of a PKC or an AKC at the detailed feature level. MKCs are permanent for a given manufacturing process. For example, the run out of a shaft diameter may be considered a PKC if it affects an important customer requirement of rotational balance and vibration when the shaft is spinning at high speeds. Experimental design might show that the rotating speed and cut depth of a machine for making the shaft have a significant impact on shaft run out. Both of these characteristics of the machine would be MKCs and would be permanent for the product unless the manufacturing equipment, process or design changes. With MKCs defined, the machine operator can focus on monitoring and controlling the rotating speed and cut depth with the understanding that these process parameters ultimately affect product vibration requirements that satisfy customer needs.

AKCs include the product, tools, fixtures and procedures, during each assembly stage, that significantly affect the realization of a KC at the next higher assembly process level during the assembly process. AKCs are permanent for a given assembly process. For example, a given design may have several options for assembly processes, including match-drilling, pin in slot, pin in hole, etc. Each candidate assembly process has a different set of a AKCs to generate the required PKCs. For example, in an aircraft, holes on temporary portions of the skin panel might be needed for positioning the skin during rivet hole drilling operations. The location of rivets on the skin panel are considered PKCs because of fatigue strength and aesthetic issues. The temporary locating holes used to create the PKC are thus AKCs. Tooling and fixture locating features such as surface, hole and edge locators that affect PKCs also might be AKCs.

AKC that cannot be achieved with current manufacturing capability is referred to herein as a StatKC. StatKCs are a subset of KCs that add significant risk to successful delivery of the product because the PKCs cannot be properly manufactured or assembled at the required cost, quality and/or schedule time. StatKCs are eliminated when the PKC problem is permanently solved.

Figure 2:
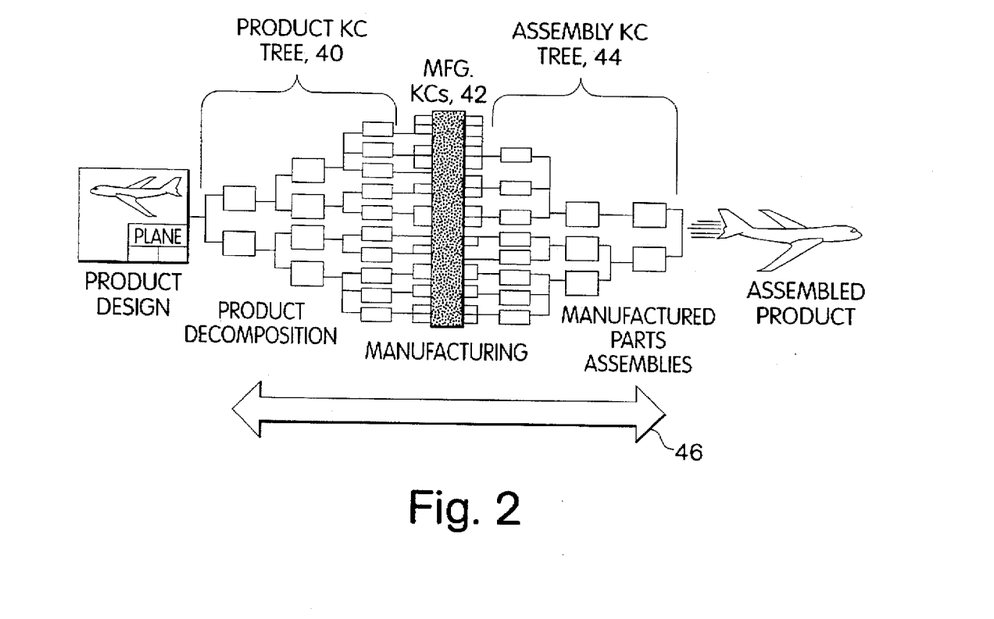
FIG. 2 is a hierarchical tree indicating relationships of key characteristics.

The KCs may be considered as forming a hierarchical tree structure where the high level KCs flow down into the lower level KCs and the low level KCs combine to create the high level KCs. However, the tree generally is not strictly hierarchical since a KC may contribute in conflicting ways to two or more high level KCs. AKC flowdown provides a view of the product requirements and how the low level features combine to meet the customer requirements. FIG. 2 illustrates a KC tree which shows how KCs are flowed through the product development process. The left-hand side of the figure shows the PKCs at 40. The decomposition of the product architecture leads to the MKCs 42 that create the detailed part features. The right-hand side of the figure shows the AKCs at 40. Upon completion of the manufacturing processes, the parts are assembled using processes, tooling and fixtures to create the production composition. The product development process should be based on an understanding of the KCs on both sides of the tree. FIG. 2 also shows the associated KCs and the double-ended arrow 46 depicts that the three categories of KCs should be assessed concurrently during product development because product and process designs are highly linked.

Figure 3:
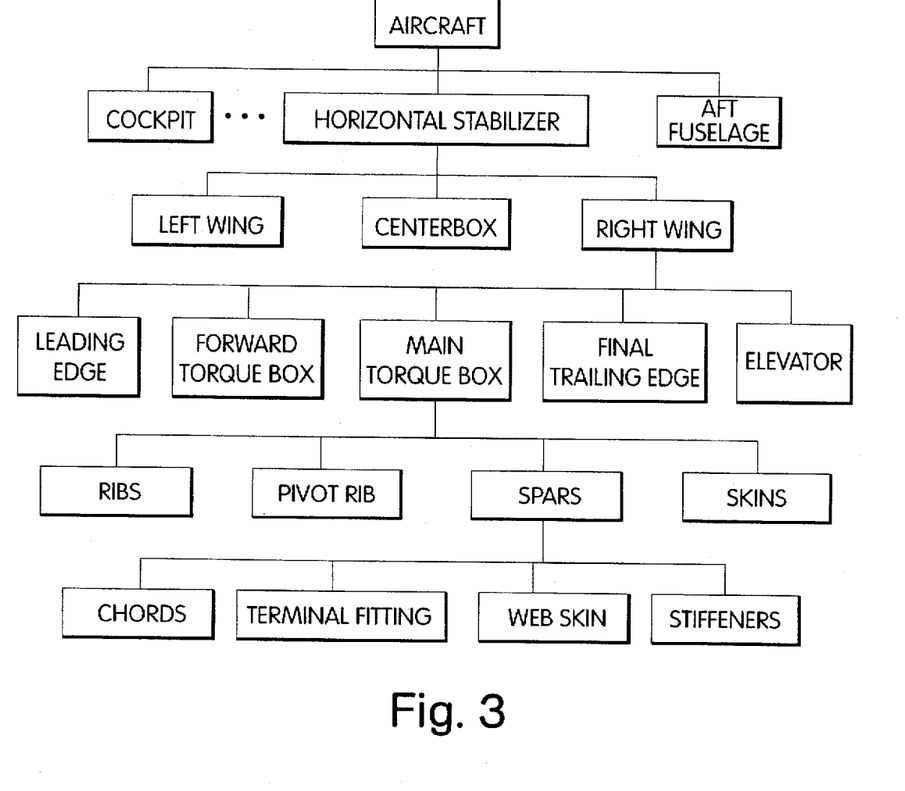
FIG. 3 is a diagram of a product architecture for an aircraft horizontal stabilizer.

A product architecture provides another way of breaking the product into manageable parts. Such a decomposition assists management of design of a complex product, so that portions of the product are designed by separate design teams. FIG. 3 shows an example product architecture for an aircraft. Given a product architecture, each portion of the product has a set of associated KCs. However, there generally is not a one-to-one mapping between the KC tree as shown in FIG. 2 and the product architecture tree, such as shown in FIG. 3.

PKCs are identified using a flowdown process from high level product requirements down to low level product features. This flowdown process is a process of decomposition and "trimming," which in general involves the following steps.

First, high level PKCs are identified, preferably quantitatively. Without quantitative requirements, it is difficult to measure product performance, function or form and thus difficult to assess if a product design has met its goals. Product requirements can come from several sources including US government regulations (such as FAA and FMVSS), regulations of countries where products will be sold, end-user customer requirements, and corporate product, safety and environmental requirements. Qualitative customer requirements can be translated into quantitative engineering specifications using Quality Function Deployment (QFD). See "The House of Quality," by J. R. Hausing et al., in *Harvard Business Review*, May–June 1988, No. 3, pp. 63–73.

Second, features at a level n+1 of a product architecture decomposition are determined, such that these features are those which combine to create the PKCs at level n. Assume n has a value of 1 at the customer requirements level and increases with the current level of decomposition. There may be more than one feature to choose as a PKC. In such a case, that feature to be chosen is one which is most likely to be shared by other PKCs or one that appears reasonable. The second step is then repeated until the detailed level of dimensions on parts is achieved (e.g., diameter of a pin, width of a sheet, etc.) or until the decision on what feature should be chosen is dependent on the manufacturing process. The PKC tree does not have to be and generally is not a pure hierarchical decomposition. PKCs at level n may contribute to more than one PKC at level n−1 or on other levels n−x. Second, different branches of the PKC tree may have different depth. The number of the PKCs should be minimized while not sacrificing the usefulness of the flowdown.

Similar AKC trees can be developed following this process; however, there may not be a one-to-one correlation to the PKC tree because assembly composition and processes would most likely be different from the product architecture. Additionally, MKCs may be identified through a design of experiments in view of the PKCs. Iterations of the identification process of the PKCs, AKCs and MKCs may be done.

The relationships between the KCs of a product should be well defined. An agile organization should be capable of defining the relationships between the KCs and the function of the product. This is useful for making tradeoffs between two KCs, understanding the effects of changes on the macroscopic view of the product, doing sensitivity analysis of the product (i.e., the effect of manufacturing variation), and providing to the rest of the design team a description of the interactions.

In order to make accurate tradeoffs, determine the effects of changes quickly and to understand the contributions of other subassemblies on a given KC, the KC is related to lower level KCs through relationships such as, but not limited to, an equation, such as KC=f (KC1, KC2 . . . ) or a relationship defined by results of a design of experiments and regression analysis.

Figure 4:
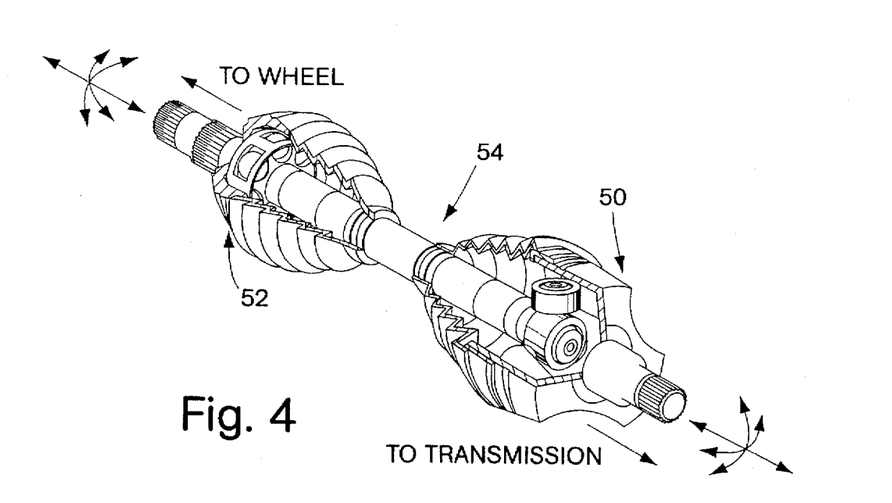
FIG. 4 is a cross-sectional perspective of a diagram of a half shaft.

Given the identified KCs, a StatKC identification process can be conducted. In this process, some or all of the KCs of a product are analyzed by combining engineering specifications, manufacturing capability and cost information. This analysis will now be described in connection with FIGS. 4–16. As an example product feature, FIG. 4 shows a front-wheel drive half-shaft, which is a component in a front-wheel drive power train. A half-shaft transmits power from the automobile transmission to a front-wheel with continuous velocity. There are two continuous velocity joints in a half-shaft. The first joint 50 is connected to the transmission (not shown) and connects a shaft 54 to the second joint 52. The second joint is then connected to the wheel (not shown). It has been found that a feature of one of the continuous velocity joints has a high correlation to a performance measure of the half-shaft. Such a correlation, in combination with knowledge of the manufacturing capability to achieve the desired feature and cost information, may be used to determine whether a performance requirement can be met at an acceptable cost in a customer's acceptance space. A general purpose computer system which receives these three pieces of information or assists in their generation is an aspect of this invention which can be used to assist in key characteristic analysis. Such a computer system will now be described.

Figure 5:
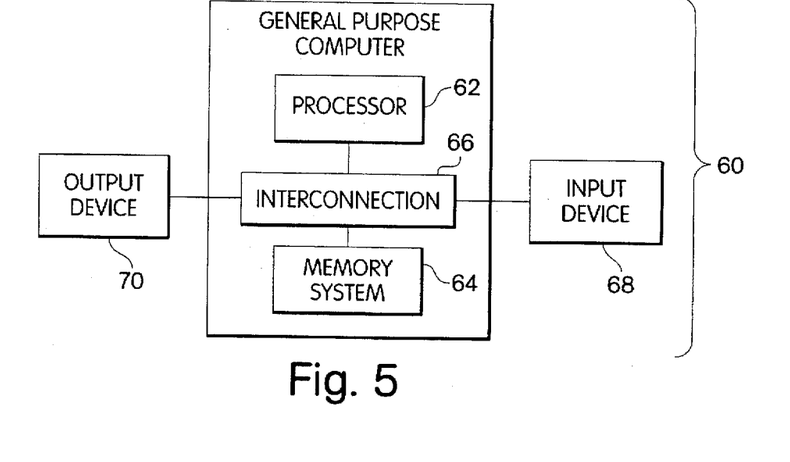
FIG. 5 is a block diagram of a computer system.

A computer system with which the present invention may be implemented will now be described in connection with FIGS. 5–7. FIG. 5 shows a computer system 60 including a processor 62 connected to a memory system 64 via an interconnection mechanism 66. Input devices 68 and output devices 70 are also connected to the processor and memory system to communicate their width through the interconnection mechanism 66. The computer system 60 may be any of a number of commercially available general purpose computing systems. Such personal computer systems typically employ commonly available processors, such as the x86 series microprocessors from Intel and the 680x0 series microprocessors from Motorola. Other suitably programmed microprocessors may be used. The interconnection mechanism 66 may be a simple bus, or may involve a more complex switching arrangement to allow the various elements of the computer system to communicate in parallel. It should also be understood that the invention is not limited to a single processor system.

An operating system (not shown) controls the execution of application programs and provides scheduling, debugging, input/output, memory management, data management, and related services on the computer system 60. The combination of the operating system and computer hardware define a computer platform or computer system. Such a computer system may be programmed using high level programming languages, such as "C" or other programming language to create an application program, which has a machine executable code created by compiling a computer file containing a program in the high level programming language. Such a high level programming language, or an application program such as a commonly available spread sheet program may be used to implement the system described below in connection with FIGS. 8–17. In one embodiment, a Macintosh Duo, from Apple Computer, of Cupertino, Calif., using the System 7.5 operating system and the Excel spreadsheet program available from Microsoft are used. The spreadsheet program is used to receive input data and process the input data according to the process described below.

Exemplary input devices which may be used with the computer system 60 include a mouse, a track ball, a pen and tablet, or other pointing devices, as well as keyboards, key pads, scanners, and other commonly used input devices for general purpose computers. The output device 70 may be a cathode ray tube (CRT) display, liquid crystal display (LCD), of which there are a number of types and other display devices such as a printer.

Figure 6:
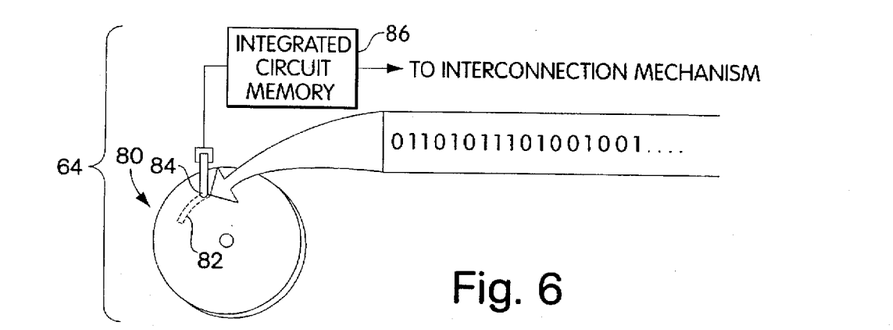
FIG. 6 is a schematic diagram of a memory system.
Figure 7:
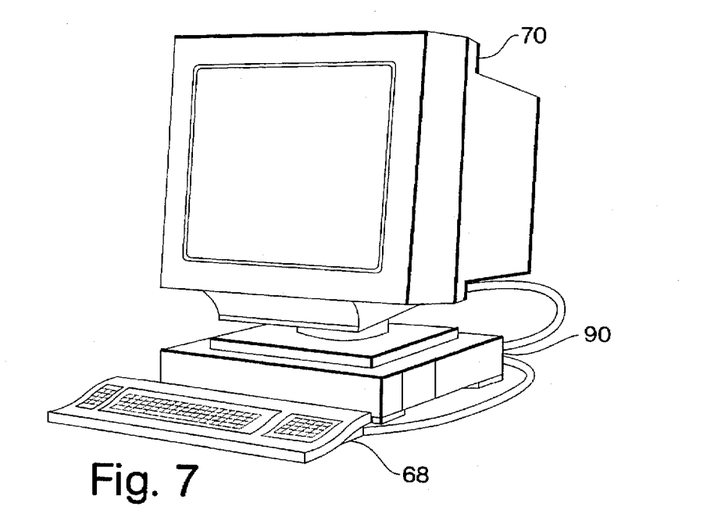
FIG. 7 is a perspective view of a computer work station.

FIG. 6 shows more details about the memory system 64 of FIG. 5. The memory system includes a computer readable and writable, random access, non-volatile recording medium 80, such as a magnetic disk or optical read/write disk. The disk may be removable, known as a floppy disk, or permanent, known as hard drive. Such a disk has a number of tracks as indicated at 82 in which signals are stored, typically in binary form, i.e., a form interpreted as a sequence of ones and zeros such as shown at 84. Such signals may define a computer program to be executed by the microprocessor, or information stored on the disk to be processed by a computer program. Typically, in operation, the processor 62 causes data to be read from the disk 80, using for example a magnetic head 84, into an integrated circuit memory element 86. The integrated circuit memory 86 allows for faster access by processor to the information than does the disk 80. The processor generally manipulates the data within the integrated circuit memory and then copies the data to the disk 80 when processing is completed. A variety of mechanisms are known for managing data movement between the disk 80 and the integrated circuit memory 86, and the invention is not limited thereto. It should also be understood that the invention is not limited to the particular input devices or output devices, the operating system, high level programming languages, processor or memory system used.

Figure 10:
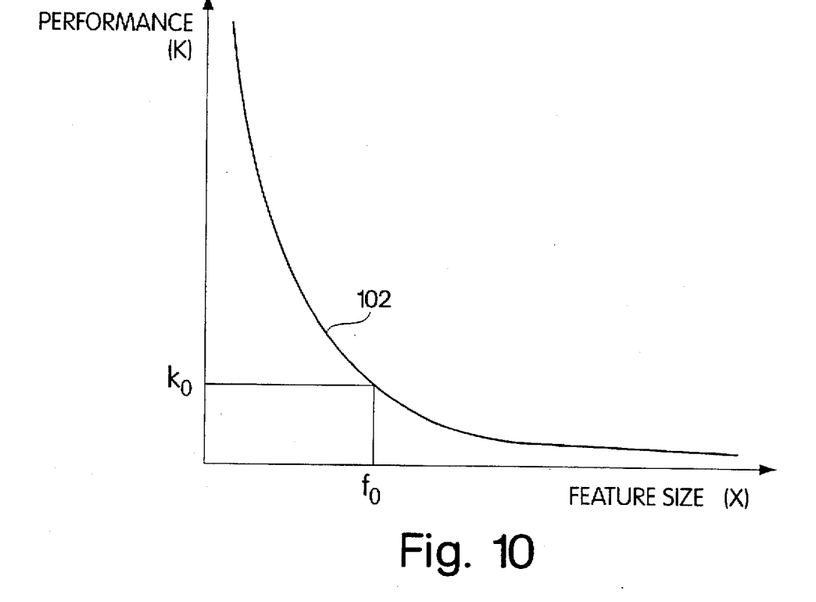
FIG. 10 is a graph illustrating the relationship of performance of a product to a value for the feature.

The computer system may be in the form of a work station such as shown in FIG. 10 which includes the general purpose computer embodied in a container 90 connected to the output display 70 and input such as a key board 68. The display may illustrate graphs or other information to the user.

Figure 8:
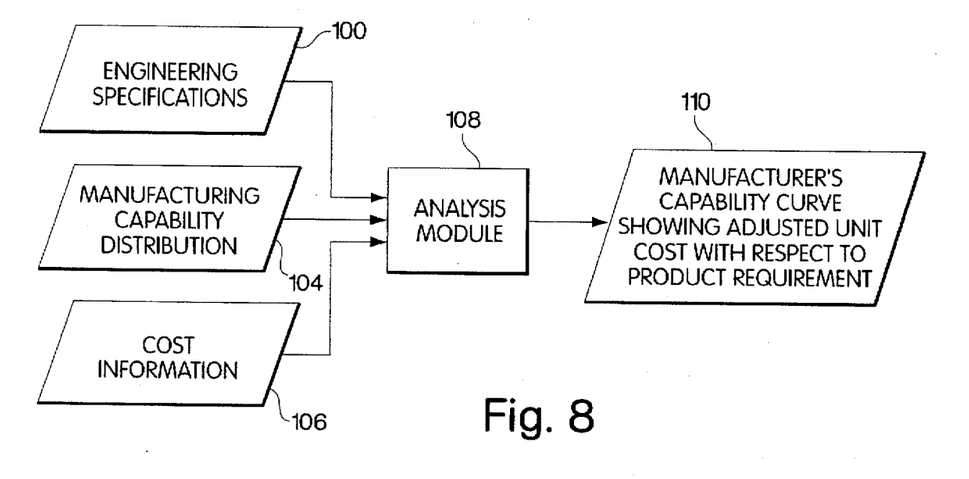
FIG. 8 is a data flow diagram of one embodiment of the present invention.

One embodiment of a system in accordance with the invention will now be described in connection with FIG. 8. Given an identification of a key characteristic according to any ethodology including the methodology defined above, its status as a "StatKC" may be analyzed. To perform such an analysis, data correlating product performance and feature value, herein called the engineering specification 100 shown in FIG. 8, is used. The engineering specification 100 may be obtained analytically, by using computer analysis (e.g. Finite element analysis), or engineering analytical methods, or empirically. Experiments may be conducted using a design of experiments (DOE) such as described by Taguchi. See Phadke, Madhav S., *Quality Engineering Using Robust Design*, AT&T Laboratories, Prentice Hall, N.J., 1989. Experiments may be conducted to determine a correlation between the desired performance defined as a key characteristic and the range of various embodiments of particular feature (a lower level KC) affecting the key characteristic. For example, the correlation between performance K (a high level KC) and feature value X (a lower level KC) may be described by an equation such as equation (1) derived from regression analysis from the results of a DOE:

$$K=1775(17.455-X)^2+2 \tag{1}$$

This correlation may be represented by a curve 102 as in the graph of FIG. 10. In FIG. 10, the feature value X is shown on the abscissa and the performance K is shown on the ordinate. Typically, the feature value is a dimension, i.e., size, but also may be its composition or other measure of state rather than performance. For the sake of simplicity, the description that follows is given using feature size as the feature value.

Figure 11:
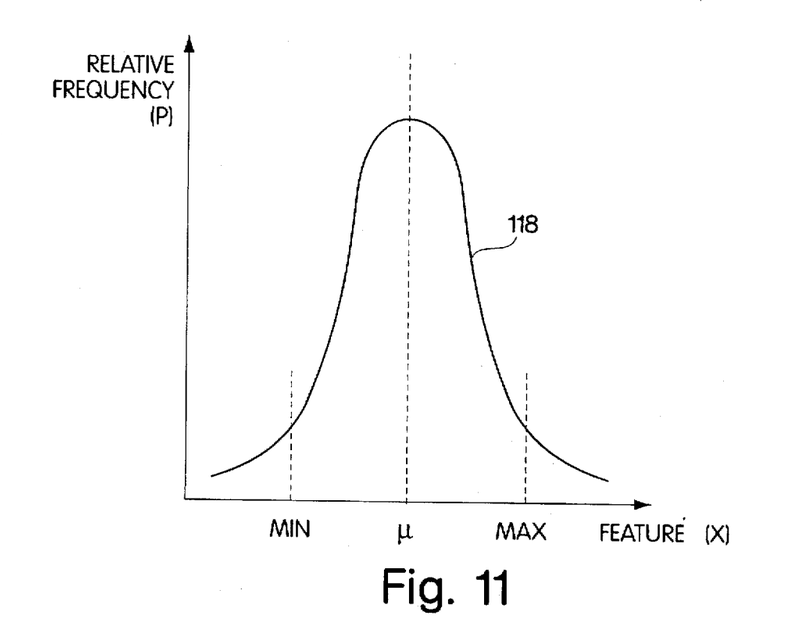
FIG. 11 is a graph illustrating a manufacturing capability distribution for achieving a product feature.

Referring again to FIG. 8, an analysis of a StatKC also uses a manufacturing capability distribution 104. An example distribution is shown by curve 118 in FIG. 11. The manufacturing capability distribution is defined by the probability that a particular component having a given target size actually has the target size when manufactured. Additionally, some of the manufactured parts are acceptable while others are unacceptable given certain minimum and maximum values. Most manufacturing organizations maintain such information (e.g., statistical process control data) as a measure of their capability to achieve certain specifications. This distribution generally fits a normal Gaussian distribution, or other standard form of probability distribution. A mathematical definition of this distribution can therefore be determined. For example, given a normalized standard deviation Z, a minimum and maximum feature sizes centered around a mean, e.g., MIN and MAX, a manufacturing process mean $\mu$ (the average of MIN and MAX, shown in FIG. 11 on the abscissa) and a manufacturing standard deviation $\sigma$, the probability of acceptable parts is given by the following equation (2), assuming a normal distribution:

$$P=P[Z<(MAX-\mu)/\sigma]-P[Z<(MIN-\mu)/\sigma]. \tag{2}$$

Unit cost information for making a product feature such as a product component, including labor material and overhead but generally not including scrap and rework, is also typically known by a manufacturer. This unit cost information is indicated at 106 in FIG. 8. In the example of the half-shaft feature discussed above, the unit cost of the product component is fifty-five cents.

Referring to FIG. 8, an analysis module 108 receives an engineering specification 100, a manufacturing capability distribution 104 and cost information 106 and processes that information to provide a manufacturer's capability curve, indicated at 110, which is a representation of an adjusted unit cost for making the product feature with respect to a performance related to the product feature.

Figure 9:
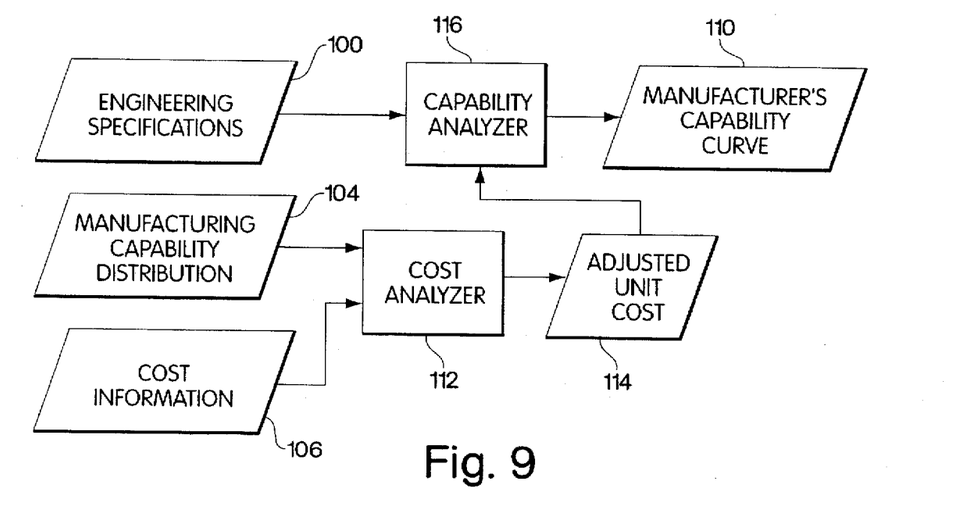
FIG. 9 is a data flow diagram illustrating more detail of the analysis module 108 of FIG. 8.
Figure 16:
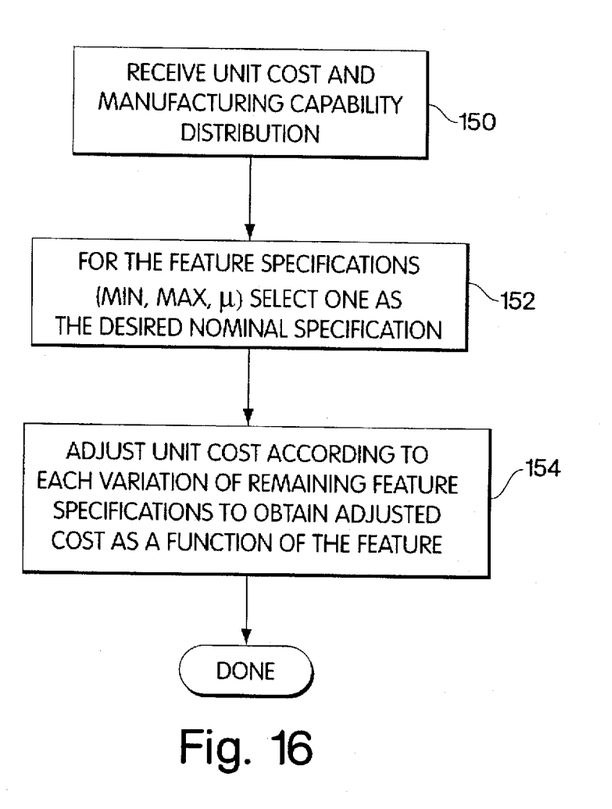
FIG. 16 is a flow chart describing a process performed by the cost analysis module 112 of FIG. 8.

A manufacturer's capability curve is described in more detail below. The process performed by analysis module 108 to obtain a manufacturer's capability curve will now be described in connection with FIGS. 9 and 16. Referring now to FIG. 9, the manufacturing capability distribution 104 and cost information 106 are input to a cost analyzer 112 to obtain an adjusted unit cost 114. The adjusted unit cost is obtained by distributing the cost of all parts outside the MIN/MAX range (i.e., the rejected parts) over the cost of the good parts. This distribution is made by dividing the unit cost by the manufacturing capability distribution. Hence, the adjusted unit cost given the example data above is fifty-five cents divided by P, where P is the probability function defined above.

The function of the cost analyzer 112 and typical adjusted unit cost functions will now be described in more detail in connection with FIGS. 12–14 and 16. The cost analyzer 112 receives the manufacturing capability distribution which is a function of a mean $\mu$, minimum MIN and maximum MAX of the feature size. Other values in the distribution are assumed to be fixed. Additionally, a desired nominal value of the feature size is selected as either the MAX, MIN or $\mu$. The desired nominal value means the feature size which provides the best performance. Other values away from the desired nominal value provide lesser performance. In the half-shaft example above, the engineering specification indicates a performance measure for which better performance is indicated by a minimum measured value. Accordingly, since the performance measure decreases as the feature size increases, the MAX value of the feature size is the desired nominal value. The desired nominal value may be indicated by a user or computed from the engineering specification given an indication of the desired performance measure.

Figure 13:
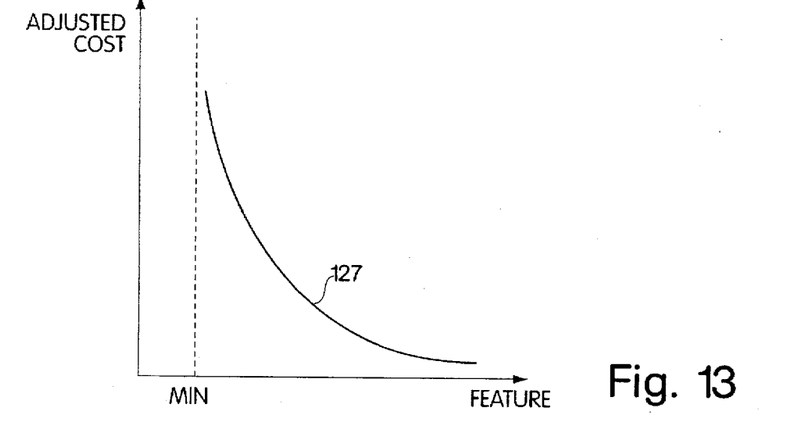
FIG. 13 is a graph of a typical adjusted unit cost function where the desired nominal value of the product feature is a minimum.
Figure 14:
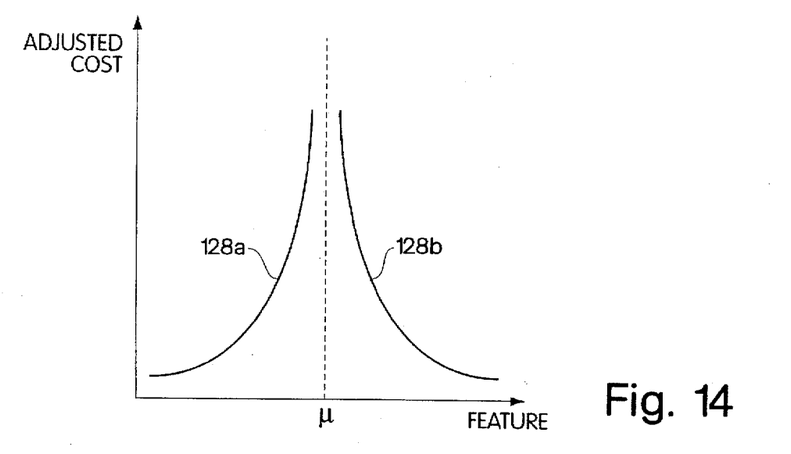
FIG. 14 is a graph of a typical adjusted unit cost function where the desired nominal value of the product feature is a mean.

The first step of computing the adjusted unit cost is receiving the manufacturing capability distribution and unit cost in step 150. A desired nominal value of the feature is then selected in step 152. Next, over a range of possible values for the other variables (two of the MIN, MAX and μ values), the manufacturing capability distribution is evaluated to obtain a value, but keeping μ between MIN and MAX (step 154), thus providing the adjusted unit cost 114. Typical shapes of an adjusted unit cost 114 are shown in FIGS. 12–14.

If the mean μ is a function of MIN and MAX, the distribution P of equation (2) is a function of one variable, using substitution, when one of MIN, MAX and μ is fixed. Thus P is a function of one variable (either MIN, MAX or μ) which is a feature size. The adjusted unit cost thus can be represented by the unit cost divided by the manufacturing capability distribution P as a function of one variable representing the feature size. For example, if MAX is the desired nominal size and μ=(MAX+MIN)/2, then P in equation (2) can be rewritten as:

$$P'=P[Z<[(MAX-(MAX+MIN)/2]/\sigma]-P[Z<[(MIN-(MAX+MIN)/2]/\sigma] \quad (3)$$

Figure 12:
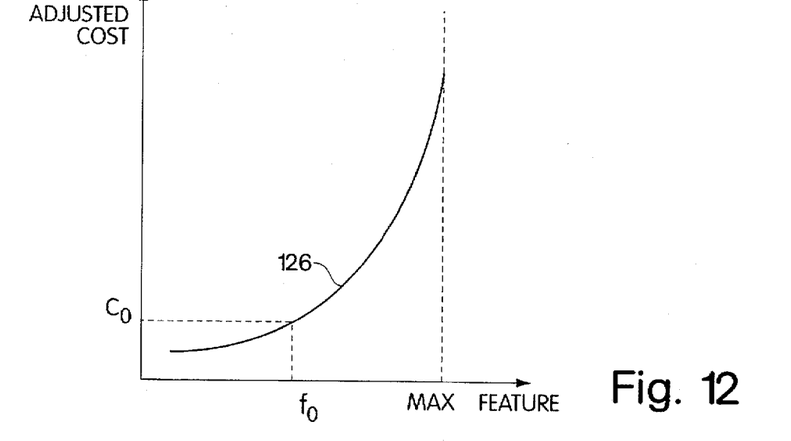
FIG. 12 is a graph of a typical adjusted unit cost function where the desired nominal value of the product feature is a maximum.

Such an equation can be represented by a curve 126 in FIG. 12. This curve indicates that adjusted unit cost increases as the acceptable minimum feature size increases towards the desired nominal feature size. Similarly, a curve 127 in FIG. 13 represents the adjusted unit cost where the MIN value is the desired nominal feature value. This curve indicates that the adjusted cost increases as the acceptable maximum feature size decreases towards the desired nominal feature size. Finally, curves 128a and 128b illustrate the case where the mean μ is the desired nominal feature size. As the acceptable MIN and MAX values become closer to μ, adjusted unit cost increases. Curves 126, 127 and 128 can be continuous or contain singularities.

The adjusted unit cost 114 is input to a capability analyzer 116 along with the engineering specifications 100. The capability analyzer 116 determines, for a number of possible feature sizes, the probable performance according to the engineering specifications 100 and the adjusted unit cost for the feature size according to the adjusted unit cost information 114. For several selected feature sizes, an ordered pair of an adjusted unit cost and probable performance is obtained. These ordered pairs represent the manufacturers capability curve 118. A flowchart describing the operation of capability analyzer 116 is shown in FIG. 17.

Figure 17:
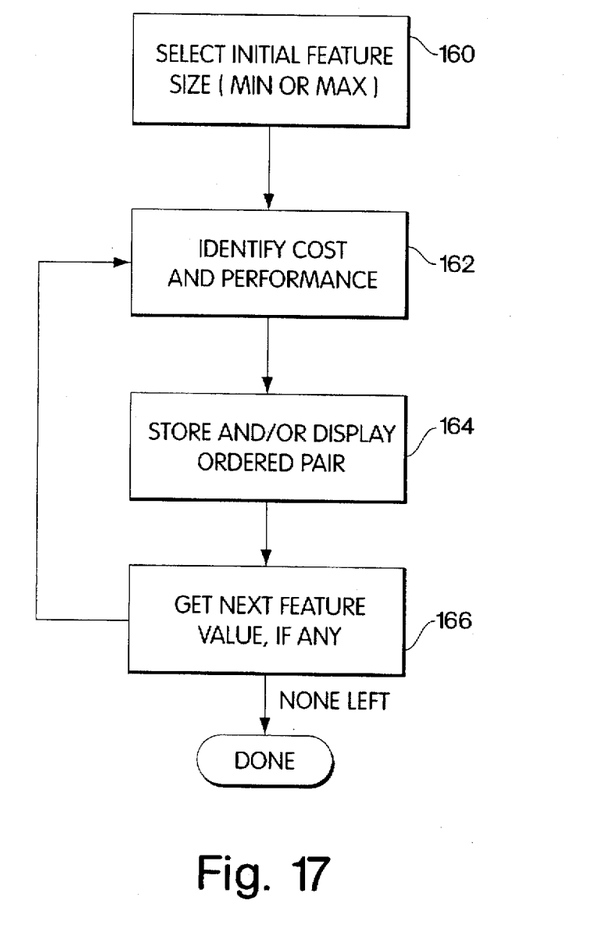
FIG. 17 is a flow chart describing a process performed by the capability analyzer 116 of FIG. 8.

Referring to FIG. 17, an initial feature size is selected in step 160. For example, the initial feature size may be the MIN or MAX value selected for the manufacturing capability distribution. The performance and adjusted unit cost for the selected feature size is determined in step 162 using the engineering specification 100 and the adjusted unit cost information 114. In particular, referring now to FIG. 10, using a selected feature size $f_o$, a corresponding performance $k_o$ is selected. Similarly, referring now to FIG. 12, using a selected feature size $f_o$, a corresponding adjusted unit cost value $c_o$ is selected. The ordered pair ($k_o$, $c_o$) of the selected performance and unit cost is then stored and/or displayed in step 164. The next feature size is selected in step 166 and steps 162 through 166 are repeated over the range of acceptable feature sizes. When complete, a graph representing the ordered pairs may be displayed and/or other operations like curve-fitting may be performed. For example, the performance value $k_o$ and adjusted unit cost $c_o$ are displayed as indicated in FIG. 15.

Figure 15:
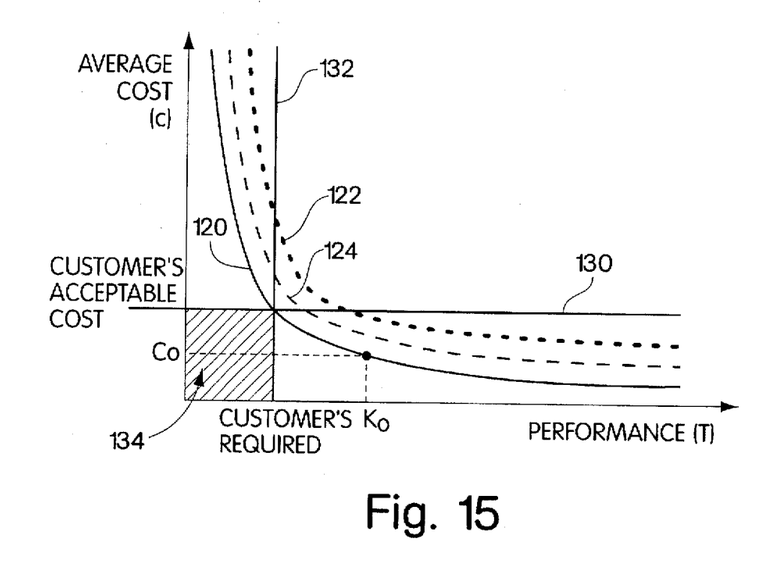
FIG. 15 is a graph illustrating the relationship between average cost versus performance, for several standard deviations for a manufacturing capability distribution, and a customer's acceptance space.

A manufacturer's capability curve 118 is represented graphically for this example in FIG. 15 as shown at 120. Different curves may also be generated for different manufacturing standard deviations. For example, given the selection of a new manufacturing standard deviation for the manufacturers capability curve, an additional manufacturer's capability curve may be generated, such as indicated at 122 and 124. These other standard deviation values may be used to determine how much of an improvement should be made to the manufacturing process or how constraints on manufacturing may be relaxed and still maintain adequate performance from the product.

A display of a manufacturer's capability curve may also be used to assist in determining whether suitable performance can be achieved at an acceptable cost. In FIG. 15, an acceptable cost is indicated at 130, and a performance requirement as indicated at 132. These two values define a customer acceptance space 134. If the manufacturer's capability curve, as indicated at 120, does not fall within the customer's acceptance space, the given feature is a "StatKC" with respect to meeting the performance requirements of the product.

With this capability to correlate customer requirement to cost, a sensitivity analysis has been conducted to assess how improvements or degradations in manufacturing capability would affect a manufacturer's capability curves. Improvements could come from machine modifications, new machines, or machine parameter adjustments derived from design of experiments.

In the example shown above, the adjusted unit cost indicates the cost of manufacture. An additional factor of profit may be added to obtain an adjusted customer unit price. Additionally, the manufacturer's capability curves for a number of key characteristics may be combined to determine the manufacturer's adjusted unit cost for combinations of product features, or for the whole product.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A computer system for analysis of manufacturing costs, comprising:

means for receiving and storing an indication of an engineering specification of a product feature indicating a performance measure of the product corresponding to a plurality of feature values for the product feature;

means for receiving and storing an indication of a manufacturing capability distribution for the product feature indicating a probability that a desired feature value is obtained with a manufacturing process;

means for receiving and storing an indication of a unit cost of the product feature; and     an analysis module having inputs for receiving the engineering specification, the manufacturing capability distribution and the unit cost of the product feature and an output providing an indication of an adjusted unit cost of the product feature as a function of the performance measure of the product corresponding to the product feature.

2. The computer system of claim 1, wherein the analysis module comprises:

a cost analyzer having an input for receiving the unit cost and the manufacturing capability distribution and an output providing an adjusted unit cost; and a capability analyzer having an input for receiving the engineering specification and a second input connected to the output of the cost analyzer to receive the adjusted unit cost, and an output providing the indication of the adjusted unit cost as a function of product performance.

3. The computer system of claim 2, wherein the cost analyzer comprises:

means for selecting a desired nominal value;

means for determining the manufacturing capability distribution as a function of one variable;

means for computing the adjusted unit cost by dividing the unit cost by the manufacturing capability distribution.

4. The computer system of claim 3, wherein the capability analyzer comprises:

means for selecting feature values of the product feature;

means for determining a performance measure corresponding to the selected feature value from the engineering specification;

means for determining an adjusted unit cost corresponding to the selected feature value; and means for determining manufacturing capability as a function of the performance measure according to the determined adjusted unit cost and the determined performance measure.

5. The computer system of claim 2, wherein the capability analyzer comprises:

means for selecting feature values of the product feature;

means for determining a performance measure corresponding to the selected feature value from the engineering specification;

means for determining an adjusted unit cost corresponding to the selected feature value; and means for determining manufacturing capability as a function of the performance measure according to the determined adjusted unit cost and the determined performance measure.

6. The computer system of claim 1, further comprising:

means for receiving an indication of required performance of the product and acceptable cost of the product feature; and means for displaying an indication of the required performance and the acceptable cost in correspondence with the indication of the adjusted unit cost as a function of product performance.

* * * * *